J. W. LEFFERTS.
Filter.
No. 212,477.  Patented Feb. 18, 1879.
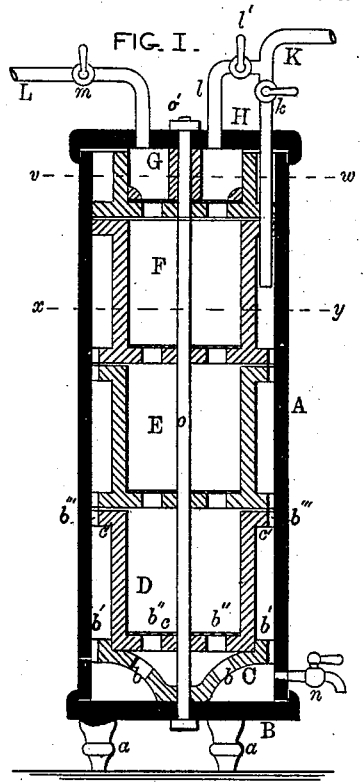
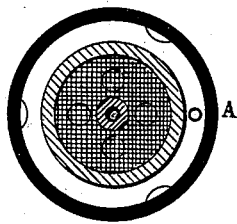
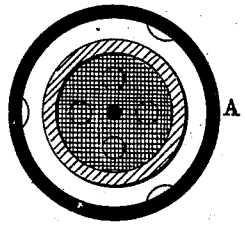
WITNESSES:
John Ahern
Wm. C. Nicholls
INVENTOR:
John W. Lefferts,
by G. H. W. T. Howard,
attys.

UNITED STATES PATENT OFFICE.

JOHN W. LEFFERTS, OF BALTIMORE, ASSIGNOR TO JOHN AHERN, OF LAURAVILLE, MARYLAND.

IMPROVEMENT IN FILTERS.

Specification forming part of Letters Patent No. 212,477, dated February 18, 1879; application filed December 16, 1878.

*To all whom it may concern:*

Be it known that I, JOHN W. LEFFERTS, of the city of Baltimore, in the State of Maryland, have invented certain Improvements in Filters, of which the following is a specification, reference being had to the accompanying drawings, and to the letters of reference marked thereon.

This invention relates to a filter for household and other purposes, which is supplied with water under pressure from the service-pipe, the water being forced into the top of the filter to the bottom thereof without coming in contact with the filtering material, and then up through the said material, to the upper part of the filter, to the delivery-faucet.

The object of the invention is to remove the delivery-faucet from the lower part of the filter, to which point a certain amount of sediment must find its way, and thereby filter the water more effectively than it can be done by filters having the delivery-faucet at their base.

Heretofore, in filters where the water has ascended through the filtering-vessels in the act of filtration, the water has been admitted to the lower part of the filter.

This invention provides for the admission of the water from above, whereby a flushing branch or pipe may be conveniently united with the inlet-pipe.

In the accompanying drawings, Figure 1 is a sectional elevation of the invention. Figs. 2 and 3 are transverse sections of the same on lines $v\ w$ and $x\ y$.

Similar letters of reference indicate similar parts in all the views.

A is a cylinder, forming the casing of the filter. B is a base-plate, in which the cylinder A rests, and which is provided with feet $a$. C is a dish, having perforations $b$ and notches $b'$ cut out of its upper edge. Within the dish C a filtering-vessel, D, is placed, having perforations $b''$ in its bottom, which communicate with the perforations $b$ in said dish. Over the perforated bottom of the vessel D is placed a gauze strainer, $c$. The upper end of said vessel is provided with a flange, $c'$, in which are cut notches $b'''$, similar to, and, when in position, in line with, the similar notches $b'$ in the edge of the dish C.

E and F are filtering-vessels, constructed in all respects like that D, except that they have an upper and a lower flange. All the corresponding notches of the several filtering-vessels, when the latter are in position, are in line.

G is the upper filtering-vessel, provided with a lower flange only, which is not notched, and rests upon a similar flange on the vessel, F, next below it.

H is the top of the filter, the under side of which rests upon the upper edge of the vessel G, a proper packing material being inserted at the joint. All the joints between the several parts are packed in a suitable manner.

K is a pipe leading from the service-pipe, and projecting into the filter by passing through holes cut in the upper pair of flanges, and the several notches in the flanges of the lower filtering-vessel. The pipe K is provided with a cock, $k$. Communicating with the pipe K is another pipe, $l$, provided with a cock, $l'$, and which enters the upper filtering-vessel, G.

L is the delivery-pipe for filtered water, which pipe is inserted in the upper vessel, and provided with a cock, $m$. The pipe L leads from the filter to any convenient locality. At the base of the filter, below the dish C and above the base-plate B, is a discharge-cock, $n$, for the delivery of cleansing-water.

All the filtering-vessels are filled with a suitable filtering material, which may be graded from the bottom up to the top one with reference to the work required of each.

The whole apparatus is tied together by a bolt, $o$, passing from end to end, and provided with nuts $o'$, as shown.

The operation is as follows: The cock $k$ being opened, the water is forced down around the filtering-vessels to the base-plate, whence it is carried or forced up through the said vessels and their filtering material to the pipe L, the cock of which, being open, discharges the water in a filtered condition. The impurities of the water are thus entirely removed from the delivery-point.

When it is desired to cleanse the filtering-vessels, the cocks $k$ and $m$ are closed, and those $l'$ and $n$ opened, when the water is forced down through the filtering material, the impurities being carried off at the lower cock, n.

I claim as my invention and wish to secure by Letters Patent—

1. The casing A, having the base-plate B and head H, combined with the perforated dish C, a series of filtering-vessels, inlet-pipe F, extending from the top of said casing into the same and outside of the filtering-vessels, and the discharge-pipe L, entering the upper filtering-vessel, all arranged substantially as specified.

2. The combination, with the casing A and series of filtering-vessels, of the inlet-pipe K, having the branch $l$, and the cocks $k$ and $l'$, as specified.

JOHN W. LEFFERTS.

Witnesses:
   WM. T. HOWARD,
   THOS. MURDOCH.